Nov. 25, 1958 R. A. BRUTSCHER, SR., ET AL 2,862,073
ELECTRICAL CONTROL SYSTEMS
Filed Sept. 30, 1957
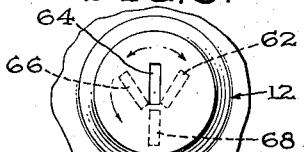
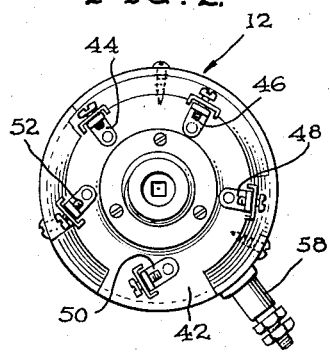
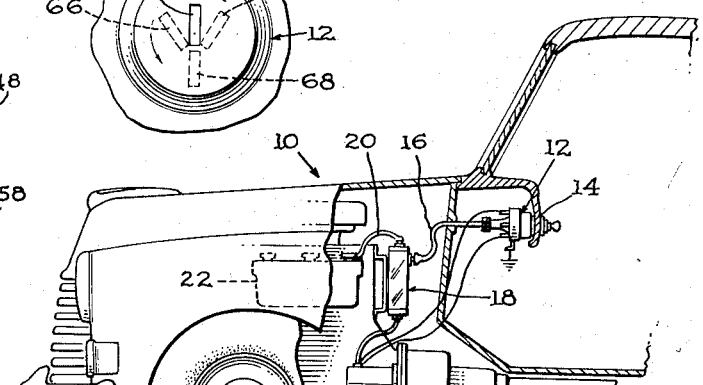
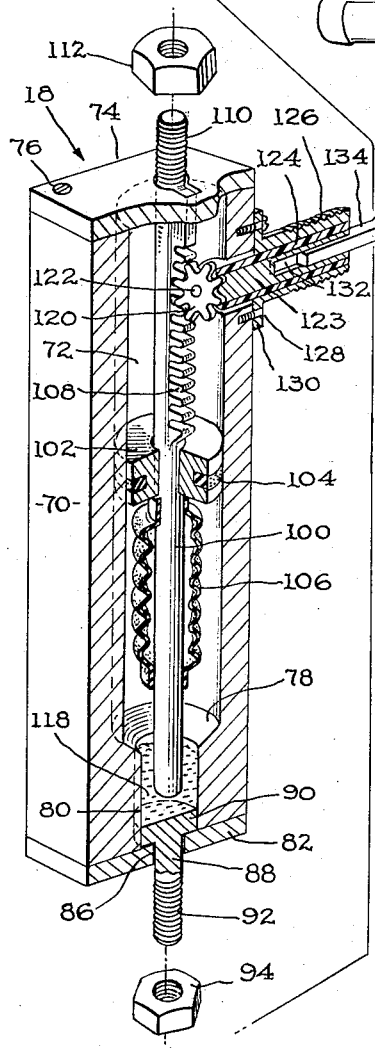
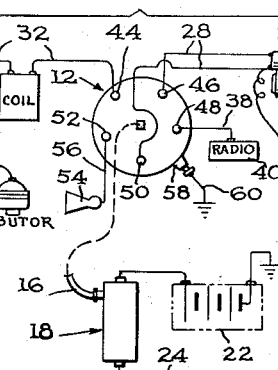
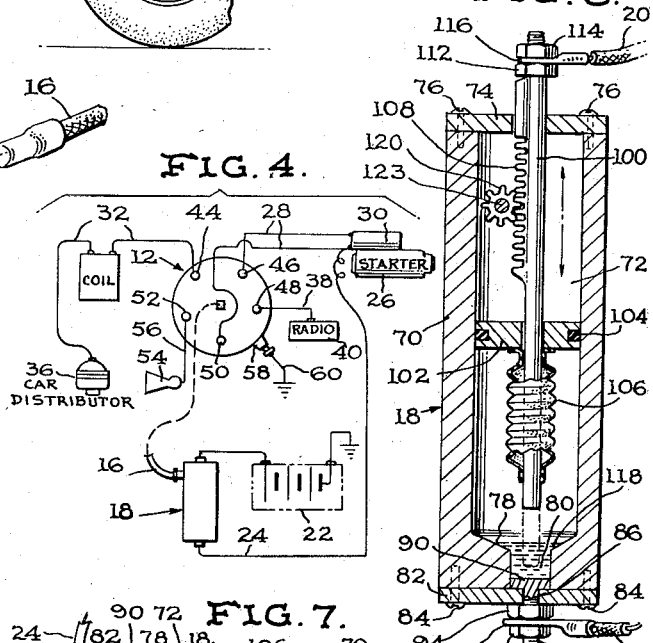
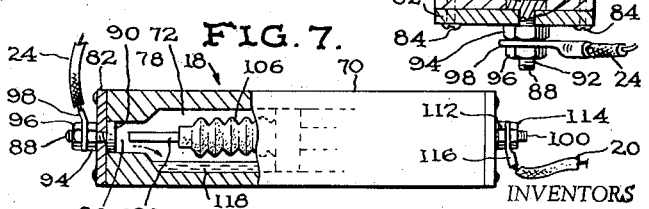
INVENTORS
RUFUS AFTON BRUTSCHER, SR
RUFUS AFTON BRUTSCHER, JR.
BY Gustave Miller
ATTORNEY

United States Patent Office 2,862,073
Patented Nov. 25, 1958

2,862,073

ELECTRICAL CONTROL SYSTEMS

Rufus A. Brutscher, Sr., and Rufus A. Brutscher, Jr., Pendleton, Oreg.

Application September 30, 1957, Serial No. 687,102

1 Claim. (Cl. 200—44)

This invention relates to a control means for the electrical system of an automotive vehicle, and it particularly relates to a control means operated from the ignition switch of the vehicle. In this respect, the present invention constitutes an improvement, in certain respects over applicants' co-pending allowed patent application Serial No. 552,437, filed December 12, 1955, Patent No. 2,813,939, of November 19, 1957.

As was set forth in the above-mentioned patent, it has been the general practice heretofore, to maintain the flow of current in the system even when the ignition switch was in the "off" position. Consequently, the lights or radio could be inadvertently left on or the horn could become struck and could not be turned off without disconnecting the wires. There was also a constant danger of fire, a constant possibility of tampering by children or others, and a necessity to disconnect the battery when the vehicle was being repaired. All these defects have been substantially eliminated by the invention disclosed in the above patent. It has, however, been found that even with the current flow turned off in the system, it is still possible for a thief, familiar with automobiles and their mechanisms, to wire around the safety cut-off switch and to thereby supply the current for turning on the ignition. It has also been found that if a car is wrecked so that it turns over on its side, when the current is flowing in the ignition system, there is a great danger of fire, which danger would be largely eliminated if the current could be automatically cut off.

It is, therefore, one object of the present invention to provide an alarm system in an electrical cut-off network wherein an alarm is automatically actuated if electrical current is passed through the network while it is in locked position.

Another object of the present invention is to provide a safety feature in the system wherein the electrical current is automatically cut off if the vehicle turns over.

Other objects of the present invention are to provide an improved safety system, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

Fig. 1 is a fragmentary view of an automobile, shown partly in section and partly in elevation, with the system of the present invention illustrated therein.

Fig. 2 is a rear elevational view of the ignition switch.

Fig. 3 is a front elevational view of the ignition switch.

Fig. 4 is a diagrammatic view of the wiring system.

Fig. 5 is a perspective view, partly broken away, showing the master switch assembly.

Fig. 6 is a sectional view showing the master switch in upright position.

Fig. 7 is a view, partly in section and partly in elevation, of the master switch in horizontal position.

Referring now in greater detail to the drawing wherein similar reference characters refer to similar parts, there is shown an automobile 10 having an ignition switch generally designated 12 mounted in the dashboard 14, as illustrated in Fig. 1.

The ignition switch 12 is connected by a flexible cable 16 to a master switch generally designated 18. The master switch 18 is connected through lead 20 to battery 22 and by cable 24 to the starter 26 (as best shown in Figs. 1 and 4). This comprises the basic power input network. The ignition switch 12 (as illustrated in Fig. 4) is also connected by leads 28 to the starter solenoid 30, by leads 32, through the coil 34, to distributor 36, and by lead 38 to the radio, heater, etc. indicated at 40. Up to this point, the system is substantially similar to that disclosed in the aforementioned patent. The various connectors on the ignition switch plate 42 are provided with distinguishing colors, for example, the connector 44 for the line leading to the distributor is brown, the connector 46 for the starter is red, the connector 48 for the accessories is black and the connector 50 for the battery is green.

In addition to the above, there is here provided a connector 52, yellow in color, for a horn 54 which is connected to connector 52 by a lead 56, and a connector 58, blue in color, for attaching a ground lead 60 to the frame of the vehicle. The ignition switch, in addition to its three former key position, to wit, the "ignition and starter position" indicated at 62 in Fig. 3, the "off and locked position" indicated at 64, and the "accessories position" indicated at 66, is now also provided with a "lock and current off and burglar alarm position" as at 68. When the key is turned to position 68, it sets up a circuit from horn 54 through switch 12 to ground. If, thereafter, current is passed through the switch 12, the horn circuit will be automatically energized to emit a loud sound. The key positions are correlated with the various post positions, as exemplified by the various connectors, in the ordinary manner.

In order to provide a cut-off of all flow of current through the system when the ignition switch is in the locked position, there is provided a master switch assembly, generally designated 18, which comprises an elongated housing 70 having a piston chamber 72 therein. The upper end of the housing 70 is open and is closed by a plate 74 held in place by screws 76. At the lower end of the housing 70, the chamber 72 is provided with a conically narrowing portion 78 which terminates in a relatively narrow sump 80. The bottom of the housing 70 is also provided with a closure plate, indicated at 82, which is held in position by screws 84.

The plate 82 substantially closes the lower end of the sump 80 except where a central hole 86 is provided in the plate 82. Through this hole 86 extends the stem of a post 88. The post 88 is provided with a head 90 within the sump 80 and this head 90 overlies and closes the hole 86. The lower end of post 88 is threaded, as at 92, to receive a nut 94. Between this nut 94 and a second nut 96 is releasably clamped a contact 98 at the end of cable 24.

Within chamber 72 is a vertically movable rod 100 having a piston disc 102 intermediate its length. The piston disc 102 is provided with a sealing ring 104 which sealingly contacts the inner walls of the chamber 72. At its lower end, below the disc 102, the rod 100 is encircled by a flexible bellows 106, the lower end of which sealingly engages the rod 100 well above the lower end of the rod. At its upper portion, above the disc 102, the rod 100 is provided with a rack portion 108. The upper end of the rod 100 extends through an opening in the top plate 74 and is threaded, as at 110, to receive a nut 112. Between this nut 112 and a second nut 114 is clamped a contact 116 on the end of cable 20 leading to the battery.

At the bottom of the chamber 72, within the sump 80 is provided a pool of mercury 118. When the lower end of rod 100 is in contact with the mercury 118, the circuit is closed between the battery and the starter whereas when the lower end of the rod 100 is spaced from the mercury, the circuit is open. In order to move the rod 100 toward and away from the pool of mercury 118 in the sump 80, there is provided a pinion 120 in mesh with the rack 108. The pinion 120 is positioned on the inner end 122 of a shaft 123 rotatable in a journal 124. The journal 124 extends through the wall of the housing 70 to accommodate the shaft 123 which must extend into the chamber 72 to bring the pinion 120 into mesh with rack 108. The outer end of the journal 124, however, is positioned in a sleeve 126 fixed to the outside of the housing 70 by means of screws 128 extending through flange 130 on the end of the sleeve 126.

The shaft 123 is provided with a slot 132 at its outer end, and in this slot 132 fits a pin 134 on one end of flexible cable 16 leading to the ignition switch 12.

In operation, when the ignition switch is turned to the starter position 62, as shown in Fig. 3, the cable 16 rotates pin 134 which, in turn, rotates shaft 123 to rotate pinion 120. The pinion 120 thereupon acts upon rack 108 to move the rod 100 into contact with the mercury pool 118. The starter circuit is thereby closed at the same time that the power circuit is placed in operation. The contact between rod 100 and the mercury pool 118 is also established in a similar manner when the ignition switch is moved to "accessories" position 66. However, when the ignition switch is in either the lock position 64 or lock and alarm position 68, the pinion 120 is actuated by the pin 134, through the agency of shaft 123, to move the rack 108 in the opposite direction whereby the rod 100 is moved up out of contact with the mercury pool 118. In this position the power circuit is open.

If the vehicle should be turned over, as in a wreck, the vertically positioned master switch 18 will be moved into a substantially horizontal position, as illustrated in Fig. 7. In this position, the mercury 118 will run out of the sump 80 and along the side, as shown in Fig. 7. Here it is out of contact with the rod and the circuit is broken, thereby cutting off the electrical current and preventing any possibility of fire. The bellows 106 not only prevents accidental contact of the mercury with the rod 100 in this horizontal position, but also acts to prevent the mercury from working up the rod 100 even in its vertical position.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

In a master switch adapted for use with an electrical alarm system for automotive vehicles of the type including a rotatable ignition switch having a plurality of connector posts thereon, a key actuated circuit maker movable into various contacting positions with said connector posts, a source of electrical energy, an electrical connection between said source of electrical energy and said ignition switch through said master switch; said master switch comprising a housing having a longitudinally movable contact rod thereon, said contact rod having one end extended out of said housing, a first electrical contact connected to said on end of said rod, a connection between said first electrical contact and the battery of the vehicle, a rack on said operating rod interiorly of said housing, a pinion engaging said rack, a flexible cable connected at one end to said pinion and at its other end to said rotatable ignition switch for imparting longitudinal movement to said rod upon rotation of said switch; a sump in the other end of said housing, a pool of mercury in said sump, said rod being longitudinally movable into and out of said pool of mercury to close an electrical circuit therethrough, a sealing partition in said housing surrounding said rod between said rack and said pool of mercury, a bellows type seal between said rod and said partition, a second electrical contact post extending from said post out of said casing, a connection between said second electrical contact and the starter of the vehicle, a connection between at least one of said connector posts and the starter of the vehicle, an alarm device, an electrical connection between a second connector post and said alarm device, a third connector post being grounded, said circuit maker being movable into a position to open the circuit between said source of electrical energy and said starter while maintaining the circuit between said alarm device and the ground.

References Cited in the file of this patent

UNITED STATES PATENTS

| | | |
|---|---|---|
| 2,047,585 | Heden | July 14, 1936 |
| 2,201,754 | Worth | May 21, 1940 |
| 2,290,124 | Colby | July 14, 1942 |
| 2,503,449 | Murray | Apr. 11, 1950 |
| 2,623,133 | Evans | Dec. 23, 1952 |
| 2,742,630 | Muncheryan | Apr. 17, 1956 |
| 2,756,408 | McKaig | July 24, 1956 |
| 2,780,797 | Gooding | Feb. 5, 1957 |